United States Patent [19]

Brickner

[11] Patent Number: 6,032,842
[45] Date of Patent: Mar. 7, 2000

[54] PORTABLE EXTERIOR VEHICLE LONGLOAD CARRIER

[76] Inventor: Richard E. Brickner, 24701 Raymond Way, #252, Lake Forest, Calif. 92630-4720

[21] Appl. No.: 09/241,804

[22] Filed: Feb. 2, 1999

Related U.S. Application Data

[60] Provisional application No. 60/077,040, Mar. 6, 1998.

[51] Int. Cl.[7] .................................................. B60R 9/00
[52] U.S. Cl. .......................... 224/560; 224/561; 224/546; 224/568; 224/571
[58] Field of Search .................................. 224/545, 546, 224/547, 555, 556, 558, 560, 561, 567, 568, 571, 548, 550, 554, 564, 565, 514, 515; 248/301, 304, 305, 306

[56] References Cited

U.S. PATENT DOCUMENTS

| | | | |
|---|---|---|---|
| 1,919,271 | 7/1933 | Cady | 224/568 X |
| 2,425,629 | 8/1947 | Mayer | 224/561 |
| 4,007,864 | 2/1977 | Hreha | 224/560 X |
| 4,234,112 | 11/1980 | Galliant | 224/568 X |
| 4,607,773 | 8/1986 | Mason | 224/561 X |
| 4,942,989 | 7/1990 | Miller | 224/560 X |
| 4,944,434 | 7/1990 | Hamilton | 224/560 X |
| 5,029,785 | 7/1991 | Besong, Jr. | 224/568 X |
| 5,620,125 | 4/1997 | Duncan et al. | 224/515 |

FOREIGN PATENT DOCUMENTS

| | | | |
|---|---|---|---|
| 2196592 | 5/1988 | United Kingdom | 224/568 |

*Primary Examiner*—Gregory M. Vidovich
*Attorney, Agent, or Firm*—Rob L. Phillips

[57] ABSTRACT

A Portable Exterior Vehicle Longload Carrier designed to assist in the safe and efficient transport of long loads. Two identical load carrying members are securely mounted by hanging a certain distance apart on a side of a vehicle allowing the long load to be transported along the vehicle's length. The load carrying members can be adjusted to mount securely to almost any vehicle and include padding on all surfaces coming into contact with the vehicle thereby preventing any vehicle damage. The load carrying members further include points to attach rope, wire, hook-end elastic bands or similar products to secure the load in place for safe transport.

4 Claims, 3 Drawing Sheets

PORTABLE EXTERIOR VEHICLE LONGLOAD CARRIER

This application claims the benefit from U.S. Provisional Application No. 60/077,040 filed Mar. 6, 1998.

FIELD OF THE INVENTION

The present invention relates to a long load carrying apparatus mountable to a vehicle, namely an automobile, pick-up or passenger truck. Two independent identical long load carrying members mount to a vehicle allowing a long load, such as lumber, to be securely transported along the length of the vehicle. The long load carrying apparatus disclosed herein is capable of being adjusted to mount to most, if not all, automobiles, pick-ups and passenger trucks.

BACKGROUND OF THE INVENTION

Long loads have traditionally been carried in an automobile with a large portion of the load protruding from the automobile's window. Similarly, if the load is carried by a pick up truck, a large portion of the load hangs off the back end of the pick up truck. Additionally, long loads have been transported by strapping the load to the roof of an automobile or truck.

Unfortunately, the traditional methods of transporting long loads are unsafe and unreliable. When a long load is extended from a vehicle there is concern that the load will come into contact with an object causing damage or destruction to the load and contacting object. Certainly if the contacting object is another vehicle, there is the possibility of vehicle damage and possible personal injuries. Strapping a long load to the roof of a vehicle is inherently unsafe and could result in the load detaching from the vehicle thereby being damaged and possibly causing an accident.

The problems described herein and others can be easily and inexpensively solved by utilizing the present invention. The present invention allows a long load to be transported safely and efficiently. The present invention is also capable of adjustment so that it may be utilized by most, if not all, automobiles, pick-ups and passenger trucks.

Several issued patents address the long load carrying dilemma. U.S. Pat. Nos. 4,007,864, 4,607,773, 4,942,989 and 4,944,434 disclose various inventions intended to allow transportation of long loads by means of automobiles. However, the issued patents mentioned herein have shortcomings that are addressed and solved by the present invention.

U.S. Pat. Nos. 4,007,864 and 4,607,773 both disclose complicated long load carrying devices with many moving parts. Therefore, either patented device could be complicated to use and with so many moving parts there is greater risk of product failure. U.S. Pat. No. 4,944,434 discloses a complicated load carrying device that allows only limited adjustment of the distance between the load carrying members, thereby limiting the load that can be carried. Lastly, U.S. Pat. No. 4,942,989 discloses a design that does not allow any adjustment of the contact points between the load carrying members and the vehicle.

The present invention is very simple and easy to use. Furthermore, mounting of the present invention can be adjusted allowing it to be used with a wider range of vehicles than previous inventions. The present invention has two independent load carrying members that can be separated a large distance allowing a wide range of loads to be carried. The portable exterior vehicle longload carrier disclosed herein solves the shortcomings of the prior art.

SUMMARY OF THE INVENTION

The present invention solves the aforementioned problems by utilizing a simple two member load carrying apparatus capable of being adjustably connected to a vehicle. Each load carrying member is identical and comprises an L-shaped carrier member permanently connected to an outer surface of an L-shaped support member forming a U-shaped void to support a load. A rectangular brace member permanently connected to a lower end of an inner surface of the L-shaped support member below the point of connection between the L-shaped carrier member and the L-shaped support member. An L-shaped locking member adjustably connected to a lower edge of a short leg at a upper end of the L-shaped support member forming an adjustable void for mounting to a vehicle.

DETAILED DESCRIPTION OF THE PREFERRED EMBODIMENT

Figure 1:
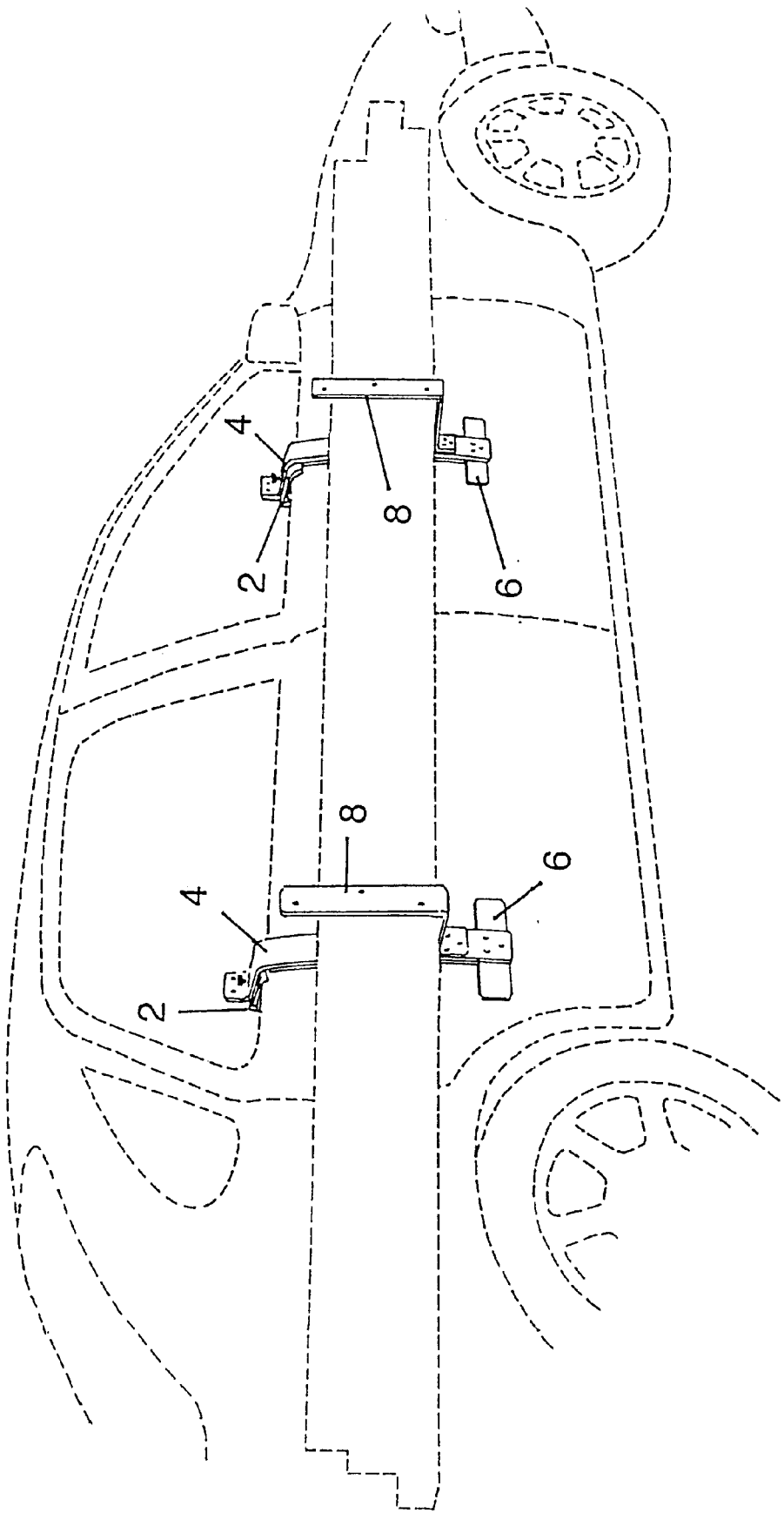
FIG. 1 is a perspective view of the preferred embodiment of the present invention depicting the apparatus loaded and mounted to an automobile.
Figure 2:
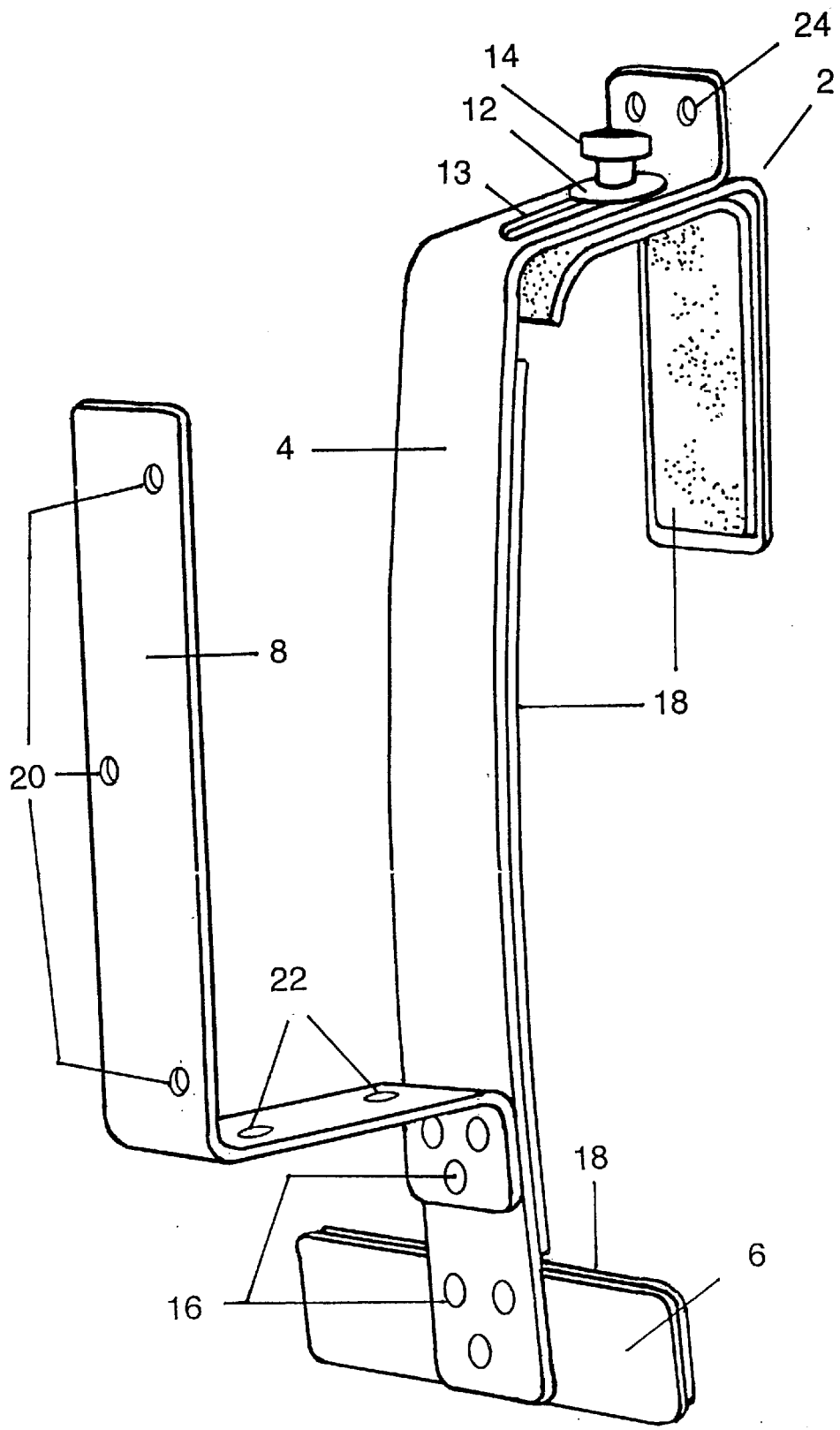
FIG. 2 is a right side perspective view depicting one of two identical load carrying members of the present invention.

Referring to FIGS. 1 and 2, the preferred embodiment of a portable exterior vehicle longload carrier according to the present invention is shown to comprise an L-shaped carrier member 8, an L-shaped support member 4, an L-shaped locking member 2 and a rectangular brace member 6.

Figure 3:
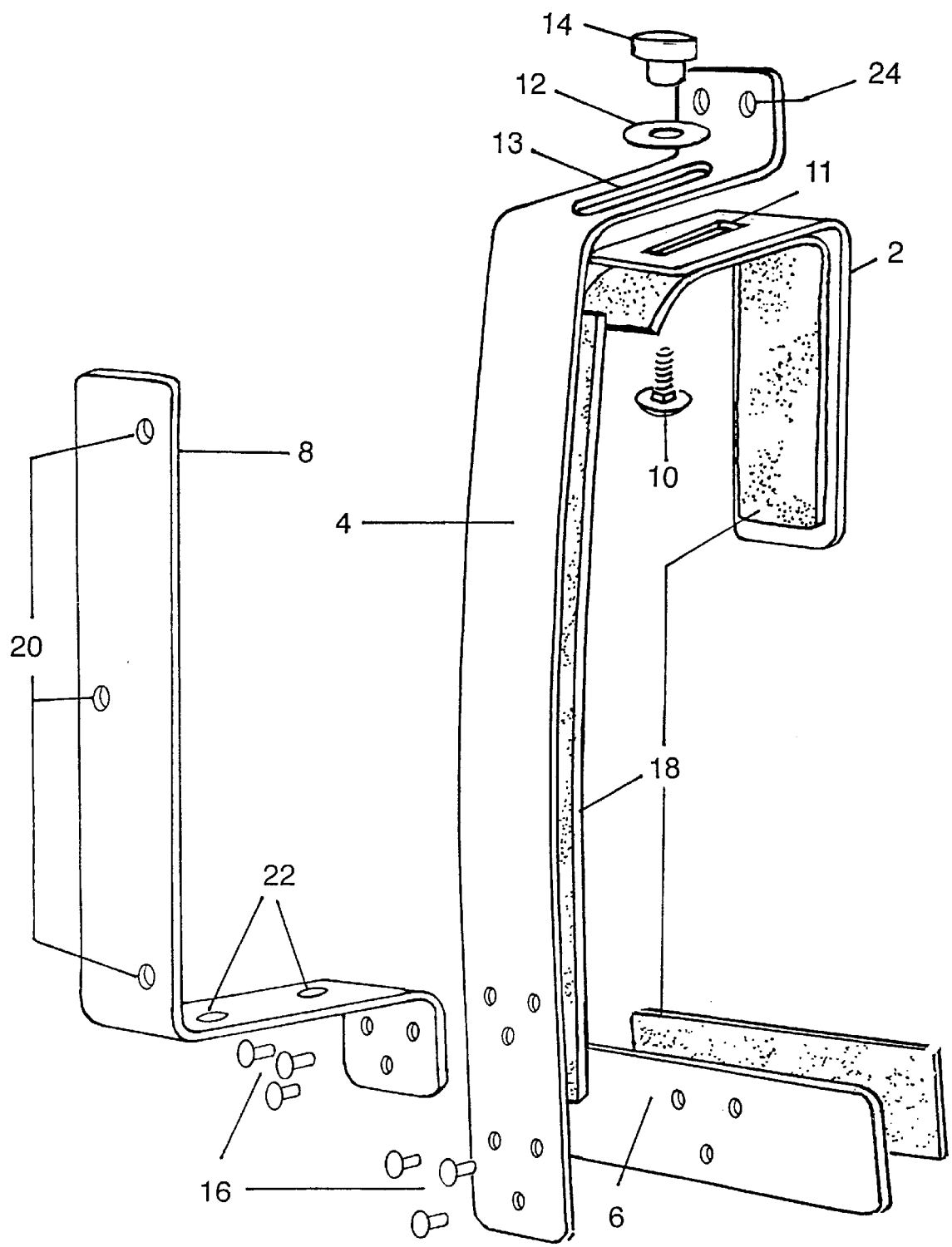
FIG. 3 is a fragmentary view depicting one of two identical load carrying members of the present invention.

Referring to FIGS. 2 and 3, means for permanently connecting the L-shaped carrier member 8 to an outer surface of the L-shaped support member 4 at a point near a lower end of a long leg of the L-shaped support member 8 causing the formation of a U-shaped void for supporting a load, further means for permanently connecting the rectangular brace member 6 to an inner surface of the L-shaped support member 4 below the connection point between the L-shaped carrier member 8 and the L-shaped support member 4, further means for adjustably connecting the L-shaped locking member 2 to a lower surface of a short leg of the L-shaped support member 4 forming an adjustable void for mounting to a vehicle.

The means for adjustably connecting the L-shaped locking member 2 to the L-shaped support member 4 may comprise any suitable means, but in the preferred embodiment this connecting means comprises a bolt 10 inserted through a first slot 11 in a short leg of the L-shaped locking member 2, the bolt 10 further inserted through a second slot 13 in a short leg of the L-shaped support member 4, the bolt 10 further inserted through a washer 12 positioned on an upper surface of the short leg of the L-shaped support member 4, a knob 14 tightened to the bolt 10 securing the L-shaped locking member 2 in place. Loosening the knob 14 allows the L-shaped locking member 2 to be adjusted along the length of both the first slot 11 the second slot 13 and then secured by tightening the knob 14 when the proper position is achieved.

The means for permanently connecting the L-shaped carrier member 8 and the rectangular brace member 6 to the L-shaped support member 4 may comprise any suitable means, but in the preferred embodiment this connecting means comprises rivets with rounded heads 16.

Means for protecting the vehicle from contact with the present invention are secured to the L-shaped support member 4, the rectangular brace member 6 and the L-shaped locking member 2. The protecting means may comprise any suitable means, but in the preferred embodiment this protecting means comprises polyethylene flexible foam strips 18.

A long leg of the L-shaped carrier member 8 includes three equally spaced holes 20, a short leg of the L-shaped carrier member 8 includes two holes 22 and an upper lip of the L-shaped support member 4 includes two holes 24 designed to accept rope, wire, hook-end elastic bands or similar products to secure a load during transport.

I claim:

1. A portable exterior vehicle longload carrier comprising:

an L-shaped carrier member, an L-shaped support member, a rectangular brace member, and an L-shaped locking member;

means for permanently connecting the L-shaped carrier member to an outer surface of the L-shaped support member at a point near a lower end of a long leg of the L-shaped support member causing the formation of a U-shaped void for supporting a load, further means for permanently connecting the rectangular brace member to an inner surface of the L-shaped support member below the connection point between the L-shaped carrier member and the L-shaped support member, further means for adjustably connecting the L-shaped locking member to a lower surface of a short leg of the L-shaped support member forming a void between the support member and the locking member for mounting to a vehicle, the carrier further comprising three holes in a long leg and two holes in a short leg of the L-shaped carrier member, and two holes in an upper lip on the short leg of the L-shaped support member, said holes designed to accept rope, wire, or hook-end elastic bands to secure a load.

2. The portable exterior vehicle longload carrier as defined in claim 1 wherein the means for adjustably connecting the L-shaped locking member to the L-shaped support member comprise a bolt inserted through a first slot in a short leg of the L-shaped locking member, the bolt further inserted through a second slot in the short leg of the L-shaped support member, the bolt further inserted through a washer positioned on an upper surface of the short leg of the L-shaped support member, a knob tightened to the bolt securing the L-shaped locking member in place.

3. The portable exterior vehicle longload carrier as defined in claim 1 wherein the means for permanently connecting the L-shaped carrier member and the rectangular brace member to the L-shaped support member is rivets.

4. The portable exterior vehicle longload carrier as defined in claim 1 wherein the rectangular brace member, the L-shaped locking member and the L-shaped support member include polyethylene flexible foam strips attached to their respective surfaces.

* * * * *